Patented Dec. 25, 1951

2,580,251

UNITED STATES PATENT OFFICE 2,580,251

AZO COMPOUND

Eliot Steinberg, North Arlington, N. J., assignor to The Maltine Company, Morris Plains, N. J., a corporation of New York No Drawing. Application July 12, 1950,
Serial No. 173,469

1 Claim. (Cl. 260—207.1)

My invention relates to a new compound which is useful as a urogenital analgesic. My new compound is p-ethyl carboxy phenyl azo-2', 4'-phenylenediamine.

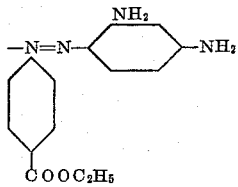

I have discovered that this azo dye, which I have prepared from ethyl p-aminobenzoate and m-phenylenediamine, is a highly effective urogenital analgesic. It is used in the form of an acid addition salt, usually the hydrochloride.

The compound of my invention is prepared by diazotizing ethyl p-aminobenzoate and coupling the resultant diazonium chloride with m-phenylenediamine. This preparation may be illustrated as follows:

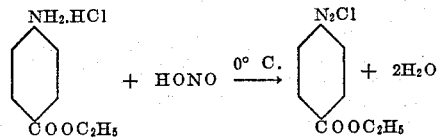

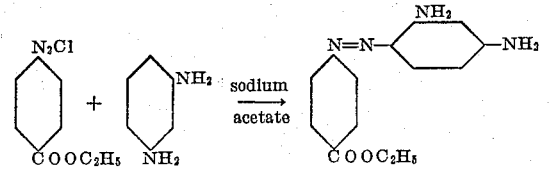

The free base is isolated by neutralization of the resultant solution with ammonium hydroxide. The crystals of free base obtained in this manner may be purified by recrystallization with the use of absolute methanol or the like. The hydrochloride can be formed and isolated by dissolving the purified free base in ether and passing dry hydrogen chloride gas through the solution to precipitate the hydrochloride or it may be isolated directly by salting the hydrochloride out of the acidic dye solution without neutralization.

Example I 16.5 grams (0.10 mole) of ethyl p-aminobenzoate was dissolved in a solution of 20 ml. of hydrochloric acid (specific gravity 1.19) in 200 ml. of water. The solution was placed in an ice bath and cooled to approximately 0° C. The solution was retained in the ice bath and diazotized with a 1 molar solution of sodium nitrite which was added slowly with constant stirring. Completeness of the diazotization reaction was determined by use of starch-iodide paper. When diazotization was complete, a second solution, containing 10.8 grams (0.10 mole) of m-phenylenediamine and 42 grams (0.30 mole) of sodium acetate dissolved in 400 ml. of water, was added to the solution containing the diazonium chloride. The resultant solution, which was dark red in color, was stirred for 30 minutes and then adjusted to a pH of 9 with ammonium hydroxide. Deep scarlet crystals formed and were removed by filtration. The crystals were washed with dilute ammonium hydroxide and water and then dried in a desiccator. This product was recrystallized from absolute methanol.

Example II

A portion of the recrystallized product of Example I, the free base, was dissolved in ether. Dry hydrogen chloride gas was passed through this solution. The hydrochloride precipitated and was removed from the solution by filtration. The dark red crystals of the hydrochloride precipitate were washed with absolute ethanol and ether.

My new compound has the following physical and chemical properties:

| | Free Base | Hydrochloride |
|---|---|---|
| Formula | $C_{15}H_{16}N_4O_2$ | $C_{15}H_{16}N_4O_2$—HCl. |
| Melting Pt. (Uncorrected) | 154° C. | 235°–239° C. |
| Color | Scarlet | Dark Red. |
| Solubility (g./100 ml.): | | |
| Alcohol | 1.93 | 0.100. |
| Water | 0.012 | 0.044. |
| Analysis: | | |
| Calculated | N, 19.7 | N, 17.5; Cl, 11.1. |
| Found | N, 19.7 | N, 16.8; Cl, 10.9. |

I claim:

P-ethyl carboxy phenyl azo-2', 4'-phenylenediamine.

ELIOT STEINBERG.

REFERENCES CITED

The following references are of record in the file of this patent:

UNITED STATES PATENTS

| Number | Name | Date |
|---|---|---|
| 1,785,327 | Ostromislensky | Dec. 6, 1930 |
| 2,009,086 | Jones | July 23, 1935 |
| 2,030,897 | Renshaw et al. | Feb. 18, 1936 |
| 2,053,095 | Maximoff | Sept. 1, 1936 |
| 2,071,875 | Engelmann | Feb. 23, 1937 |
| 2,135,008 | Kleiner et al. | Nov. 1, 1938 |